United States Patent [19]

Motohashi et al.

[11] Patent Number: 4,904,361
[45] Date of Patent: Feb. 27, 1990

[54] ELECTRODEPOSITION COATING COMPOSITION

[75] Inventors: Akira Motohashi, Yokohama; Yoshimitsu Tsukahara, Yokosuka; Kazuo Masuda; Hidehiko Haneishi, both of Yokohama; Masafumi Kume; Hirokazu Hayashi, both of Hiratsuka, all of Japan

[73] Assignees: Kansai Paint Co., Ltd., Hyogo; Sankyo Organic Chemicals Co., Ltd., Kanagawa, both of Japan

[21] Appl. No.: 318,720

[22] Filed: Mar. 3, 1989

[51] Int. Cl.$^4$ .................. C25D 13/06; C08L 63/00
[52] U.S. Cl. .................. 204/181.7; 523/415; 528/45; 528/92
[58] Field of Search .................. 204/181.7; 523/415; 528/45, 92

[56] References Cited

U.S. PATENT DOCUMENTS

| | | | |
|---|---|---|---|
| 3,915,923 | 10/1975 | Ward | 524/726 |
| 3,984,299 | 10/1976 | Jerabek | 204/181.7 |
| 4,017,438 | 4/1977 | Jerabek | 204/181.7 |
| 4,071,428 | 1/1978 | Bosso | 204/181.7 |
| 4,615,779 | 10/1986 | McCollum | 204/181.7 |
| 4,711,917 | 12/1987 | McCollum | 204/181.7 |

Primary Examiner—John F. Niebling
Assistant Examiner—Ben C. Hsing
Attorney, Agent, or Firm—Wenderoth, Lind & Ponack

[57] ABSTRACT

An electrodeposition coating composition containing blocked isocyanate groups comprising at least one dialkyltin aromatic carboxylic acid salt represented by the following formula

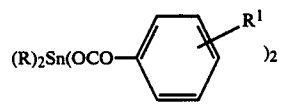

[I]

or

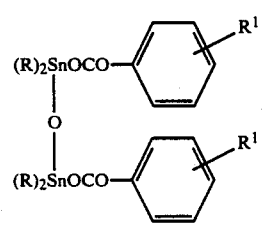

[II]

wherein R represents an alkyl group having 1 to 12 carbon atoms, and $R^1$ represents a hydrogen atom or an alkyl group having 1 to 4 carbon atoms.

13 Claims, No Drawings

ELECTRODEPOSITION COATING COMPOSITION

This invention relates to an electrodeposition coating composition which can give a coated film having excellent corrosion resistance and weatherability and has excellent low-temperature curability and long-term bath stability.

Electrodeposition paints have gained widespread acceptance in the coating of articles having many parts with a box structure, such as automobiles and electrical appliances because they form coated films of excellent corrosion resistance with an excellent throwing powder. Recently, cationic electrodeposition coating replaced anionic electrodeposition in fields where corrosion resistance is regarded as important, for example, in the coating of automobile bodies because cathodic electrodeposition forms a coated film having particularly excellent corrosion resistance. Cationic electrodeposition paints comprising base resins of the type curable by the reaction of the blocked isocyanate groups with the hydroxyl groups are now mainly used for the cationic electrodeposition, and there is used as a dissociation catalyst (i.e., curing catalyst) for the blocked isocyanate groups, for example organotin compounds such as dibutyltin oxide (DBTO), dioctyltin oxide (DOTO), dibutyltin dilaurate (DBTDL), dioctyltin dilaurate (DOTDL), and dibutyltin diacetate (DBTDA) (see U.S. Pat. Nos. 4,071,428, 4,615,779, 4,711,917 and 4,785,068). Since DBTO and DOTO are only sparingly soluble in solvents, they are in the form of a fine powder. DBTDL, DOTDL and DBTDA are used as such or dissolved in a solvent. When the dissociation catalyst is used in the form of a powder, it floats in the air in the production of an electrodeposition paint and is difficult to handle, and also entails a problem of catalyst poison. Furthermore, it is necessary to disperse the catalyst in the coating composition. If the dispersion is insufficient, defects such as cratering occur in the coated film. Furthermore, in order to obtain sufficient curability, such a particulate catalyst must be used in a large amount, and this results in an economic disadvantage.

On the other hand, since DGTDL, DOTDL and DBTDA are easy to handle and need not to be dispersed, they are desirable for practical application. However, these catalysts have poor compatibility with resins, particularly epoxy resin, generally used in electrodeposition paints, the incorporation of these catalysts in electrodeposition coating compositionscan result in film defects such as cratering and seeding. Moreover, with the lapse of time, the organotin compounds will be expelled out of the resin emulsion, and lose their catalytic effect. This drawback is particularly serious.

Furthermore, because these conventional dissociation catalysts do not have sufficiently high catalytic activity and require high baking temperatures, it has been desired to develop catalysts that can induce curing at lower temperatures.

The present inventors conducted extensive investigations in order to obtain an electrodeposition coating composition having blocked isocyanate groups and containing a tin compound, which does not cause film defects such as cratering and seeding, does not decrease in catalytic effect with time, and has excellent low-temperature curability. These investigations have now led to the discovery that the above purpose can be achieved by using a specific dialkyltin aromatic carboxylic acid salt as the tin compound.

Thus, according to this invention, there is provided an electrodeposition coating composition containing blocked isocyanate groups comprising at least one dialkyltin aromatic carboxylic acid salt represented by the following formula

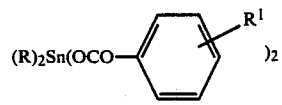

[I]

or

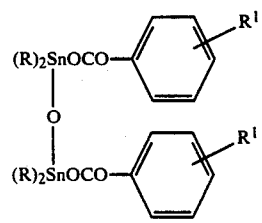

[II]

wherein R represents an alkyl group having 1 to 12 carbon atoms, and $R^1$ represents a hydrogen atom or an alkyl group having 1 to 4 carbon atoms.

In the dialkyltin aromatic carboxylic acid salt represented by formula [I] or [II], the alkyl group R may be linear or branched, and includes, for example, methyl, ethyl, n-propyl, isopropyl, n-butyl, isobutyl, sec-butyl, t-butyl, pentyl, isoamyl, hexyl, n-octyl, 2-ethylhexyl, decyl and dodecyl groups. n-Butyl and n-octyl groups are preferred as R. $R^1$ is a hydrogen atom, or an alkyl group having 1 to 4 carbon atoms, for example, methyl, ethyl, n-propyl, isopropyl, n-butyl, isobutyl, sec-butyl and t-butyl groups. The hydrogen atom and t-butyl group are preferred as $R^1$. The substituent $R^1$ on the benzene ring may be substituted at an of the ortho-, meta- and para-positions, preferably at the para-position.

Specific examples of the dialkyltin aromatic carboxylic acid salt of formula [I] or [II] are given below.

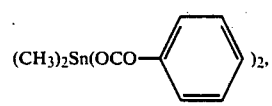

[1]

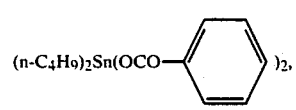

[2]

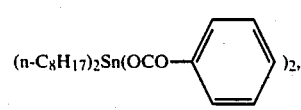

[3]

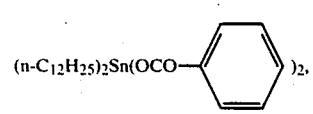

[4]

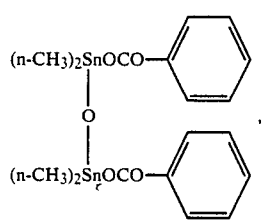
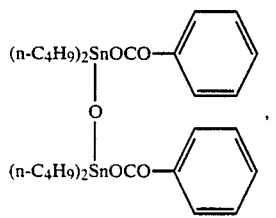
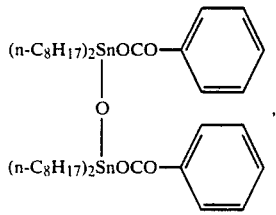
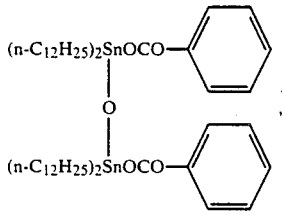
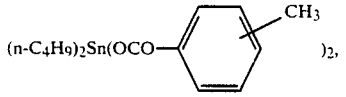
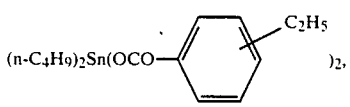
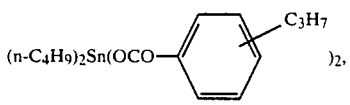
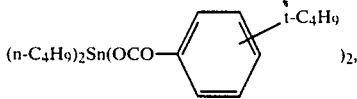
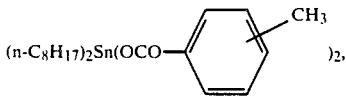
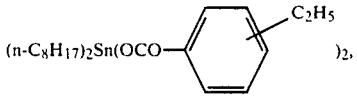
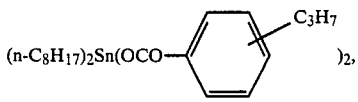
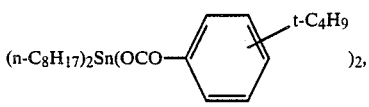
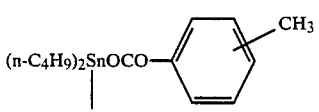
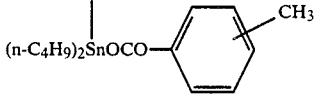
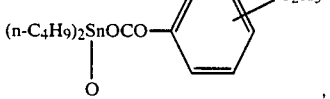
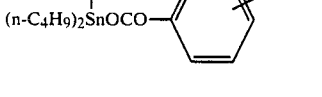
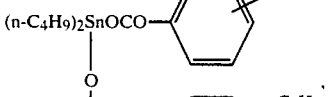
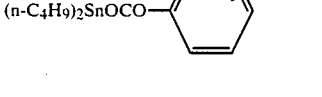
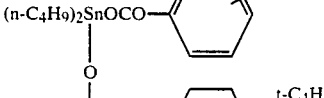
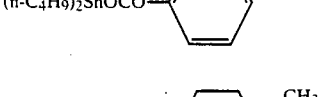
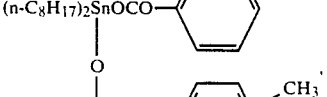
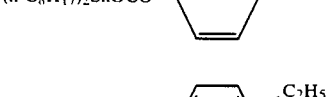
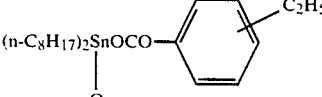
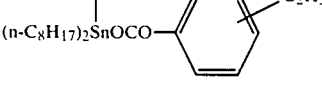

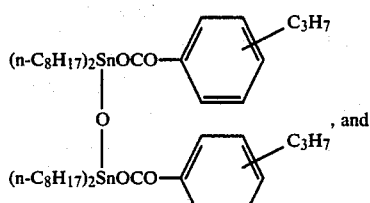

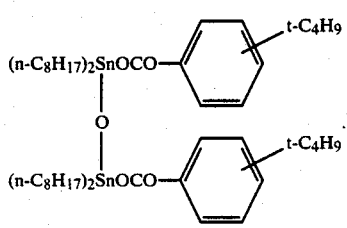

Preferred as the compound of formula [I] are

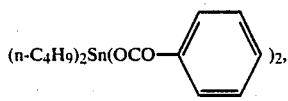  [2]

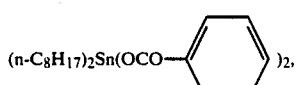  [3]

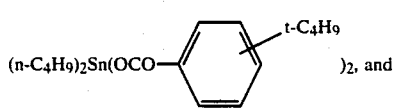  [12]

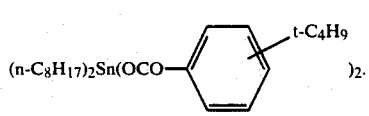  [16]

Preferred as the compound of formula [II] are

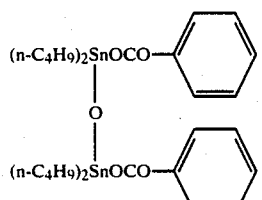  [6]

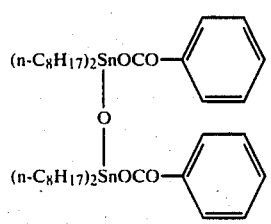  [7]

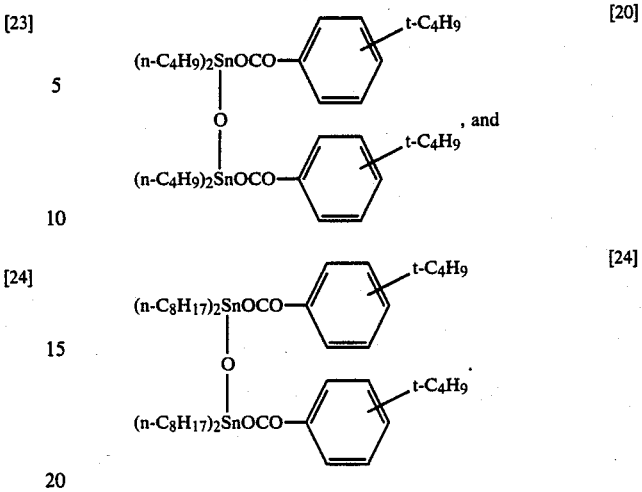

[23]

[24]

[20]

[24]

Compounds of formulae [2], [3], [6] and [7] are especially preferred as the dialkyltin aromatic carboxylic acid salt of formula [I] or [II].

The dialkyltin aromatic carboxylic acid salt of formula [I] or [II] can be produced by reacting a dialkyltin oxide represented by the following formula $$(R)_2SnO \qquad [III]$$

wherein R is as defined above, with an aromatic carboxylic acid represented by the following formula

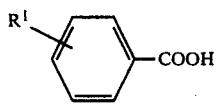  [IV]

wherein $R^1$ is as defined above, in a [III]/[IV] mole ratio of about ½ for producing the compound of formula [I], and at a [III]/[IV] mole ratio of about 1/1 for producing the compound of formula [II]; or reacting a dialkyltin halide represented by the following formula $$(R)_2SnX_2 \qquad [V]$$

wherein X represents a halogen atom, and R is as defined above, with an aromatic carboxylic acid salt represented by the following formula

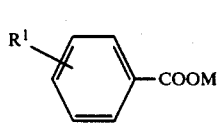  [VI]

wherein M represents an alkali metal such as sodium, and $R^1$ is as defined above.

It has been found in accordance with this invention that by incorporating the dialkyltin aromatic carboxylic acid salt as a curing catalyst in an electrodeposition coating composition instead of the conventional tin compounds, the compatibility of the tin compound with a base resin for electrodeposition paints, particularly an epoxy resin, is strikingly enhanced, the resulting electrodeposition coating composition has excellent bath stability and can give a coated film free from defects such as cratering and seeding, the curing temperature can be lowered, the tin compound does not lose its catalytic effect with the lapse of time, and the properties, such as corrosion resistance and weatherability, of the electrodeposited film can be greatly improved.

The amount of the dialkyltin aromatic carboxylic acid salt to be incorporated is not critical and can be varied widely according to the properties required of the electrodeposition coating composition. Generally, it is 0.05 to 10 parts by weight, preferably 0.1 to 5 parts by weight, per 100 parts of the resin solids in the electrodeposition coating composition.

If desired, an ordinary curing catalyst such as DBTO or DOTO may be used in combination with the dialkyltin aromatic carboxylic acid salt. The combined use can further increase the low temperature curability.

The blocked isocyanate group-containing electrodeposition coating composition of this invention may include any anionic and cationic electrodeposition coating composition which has a resin composition containing blocked isocyanate grops, and in which during curing, the blocking agent of the blocked isocyanate group is separated and free isocyanate groups are generated and the resulting free isocyanate groups react with the active hydrogen-containing moiety of the resin composition. Preferably, the electrodeposition coating compositions of the invention are cationic.

The base resin in the electrodeposition coating composition of this invention may be a resin which contains blocked isocyanate groupsin the molecule and self-cures without the need for an external crosslinking agent or a resin which does not have blocked isocyanate groups in the molecule and needsan external crosslinking agent containing a blocked isocyanate compound. Combination of the self-crosslinking type and the external crosslinking type may also be used.

The blocked isocyanate compond used as a crosslinking agent in the external crosslinking type composition may be an addition reaction product between a polyisocyanate compound and an isocyanate blocking agent. Examples of the polyisocyanate compound include aromatic, alicyclic and alphatic polyisocyanates such as tolylene diisocyanate, xylylene diisocyanate, phenylene diisocyanate, bis(isocyanate methyl)cyclohexane, tetramethylene diisocyanate, hexamethylene diisocyanate, methylene diisocyanate, and isophorone diisocyanate and isocyanate-terminated compounds obtained by reacting an excess of these polyisocyanate compounds with low-molecular·active hydrogen-containing compounds such as ethylene glycol, propylene glycol, trimethylolpropane, hexanetriol and castor oil.

The isocyanate blocking agent adds to the isocyanate groups of the polyisocyanate compounds and blocks them temporarily. The blocked isocyanate compounds formed by the addition should be stable at room temperature, and when heated to the baking temperature for the electrodeposited film within about 110° to about 220° C., preferably about 120° to about 180° C., dissociate the blocking agent to yield free isocyanate groups. Examples of blocking agents that meet this requirement include lactams such as epsilon-caprolactam and gammabutyrolactam, oximes such as methyl ethyl ketoxime and cyclohexanaoneoxime, phenols such as phenol, para-t-butylphenol and cresol, aliphatic alcohols such as n-butanol and 2-ethylhexanol, aromatic alkyl alcohols such as phenylcarbinol and methylphenylcarbinol, and ether alcohol compounds such as ethylene glycol monobutyl ether.

Of these, the oximes and lactams are especially preferred from the standpoint of the curability of the electrodeposition coating composition because they dissociate at relatively low temperatures.

Blocked isocyanate groups may be introduced into the base resin molecule to make the base resin self-curable. The introduction can be carried out by a known method. For example, this can be accomplished by reacting the free isocyanate groups of a polyisocyanate compound partially blocked with the aforesaid blocking agent with the active hydrogen-containing moiety in the base resin.

The electrodeposition coating composition of this invention may be anionic or cationic, and the base resin in it may be any of those resins which have heretofore been used as base resins for electrodeposition coating compositions, for exampleepoxy resin, acrylic resin, polybutadiene resins, alkyd resins and polyester resins. Cationic base resins are preferred in view of corrosion resistance, and above all, polyamine resins typified by amine-epoxy resin adducts are preferred. If the base resin is a combination of the self-crosslinking type and the external crosslinking type, it is essential to incorporate the above blocked isocyanate compound.

Examples of the amine-epoxy resin adducts preferably used in this invention include (1) adducts between polyepoxide compounds and primary mono- or polyamines, secondary mono- or polyamines or primary-secondary mixed polyamines (see, for example, U.S. Pat. No. 3,984,299), (2) adducts between polyepoxide compounds and secondary mono- or polyamines having a ketiminized primary amino group (see, for example, U.S. Pat. No. 4,017,438), and (3) reaction products obtained by etherification of polyepoxide compounds and hydroxy compounds having ketiminized primary amino group (see, for example, Japanese Laid-Open Patent Publication No. 43013/1984).

The polyepoxide compound used to produce the amine-epoxy resin adduct is suitably a compound containing at least two epoxy groups (oxirane groups)

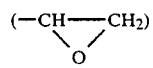

per molecule, and usually having an epoxy equivalent of 100 to 3000, preferably 200 to 2000, more preferably 400 to 1500, and a number average molecular weight of at least 200, preferably 400 to 4000, more preferably 800 to 3000. Polyepoxides obtained by the reaction of polyphenol compounds with epichlorohydrin are preferred. Examples of the polyphenol used to form the polyepoxide include bis(4-hydroxyphenyl)-2,2-propane, 4,4-dihydroxybenzophenone, bis(4-hydroxyphenyl)-1,1-ethane, bis-(4-hydroxyphenyl)-1,1-isobutane, bis(4-hydroxy-tert-butyl-phenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4-dihydroxydiphenylsulfone, phenol novolak, and cresol novolak.

The polyepoxides may be partially reacted with polyols, polyether polyols, polyester polyols, polyamideamines, polycarboxylic acids, polyisocyanate compounds, etc., or may be graft-polymerized with epsilon-caprolactone, acrylic monomers, etc.

In the present invention, the dialkyltin aromatic carboxylic acid salt is included into the blocked isocyanate group-containing electrodeposition coating composition. If desired, the dialkyltin aromatic carboxylic acid salt may be dissolved in a solvent prior to the inclusion.

Solvents generally used for electrodeposition paints and can dissolve the dialkyltin aromatic carboxylic acid salt are preferred. Examples include ethylene glycol monoethylether, ethylene glycol monobutyl ether, isopropanol and butanol. Preferably, the dialkyltin aromatic carboxylic acid salt is added to the electrodeposition coating composition before the base resin is converted into a water solution or dispersion. It can be easily performed by stirring the mixture by a stirrer.

Conversion of the base resin for the electrodeposition coating composition into the form of a water solution or dispersion can be carried out by neutralizing the resin with a water-soluble organic acid such as forming acid, acetic acid, propionic acid, hydroxyacetic acid, citric acid or lactic acid or a water-soluble inorganic acid such as hydrochloric acid, sulfuric acid or phosphoric acid (when the resin is a cationic resin), or with an amine or an alkali such as an alkali metal hydroxide (when the resin is an anionic resin) instead of the water-soluble organic acid or water-soluble inorganic acid and mixing the product with water to render the resin water-soluble or water-dispersible.

As required, the electrodeposition coating composition of this invention may further contain ordinary paint additives, for example, colored pigment such as titanium white, carbon black, red iron oxide and chrome yellow, fillers such as talc, calcium carbonate, mica, clay and silica, anticorrosive pigments such as strontium chromate and zinc chromate, lead pigments such as basic lead silicate and lead chromate, and organic solvents such as isopropanol, butanol, ethylene glycol monobutyl ether, ethylene glycol monoethyl ether, diethylene glycol monoethyl ether, propylene glycol monoethyl ether, dipropylene glycol monoethyl ether, ethylene glycol diethyl ether, benzyl alcohol, 2-ethylhexyl glycol and methyl isobutyl ketone.

The electrodeposition coating composition of this invention may be coated on the surface of a substrate by electrodeposition. The electrodeposition may be carried out by a known method. Generally, the electrodeposition coating composition of this invention is diluted with deionized water, etc., to a solids concentration of about 5 to 40% by weight, and its pH is adjusted to about 5.5 to about 9. The adjusted electrodeposition bath containing the electrodeposition coating composition is kept at 15° to 35° C., and the electrodeposition is carried out at an applied voltage of 100 to 400 V.

The thickness of the coated film formd by electrodeposition from the coating composition of this invention is not particularly limited. Generally, it is preferably 10 to 40 micrometers as the cured coated film. The suitable baking temperature for the coated film is generally about 110° to 220° C., preferably about 120° to 180° C.

According to the present invention described hereinabove, by using the specific dialkyltin aromatic carboxylic acid salt in place of the conventional dissociation catalyst for dissociating the block isocyanate groups in an electrodeposition paint containing blocked isocyanate groups, there can be obtained an electrodeposition coating composition which has excellent bath stability, does not cause film defects such as cratering and seeding can be cured at lower temperatures and does not lose a catalytic effect with the lapse of time, and can give coated films having improved corrosion resistance and weatherability.

The following examples illustrate the present invention more specifically. All parts and percentages in the following examples are by weight.

SYNTHESIS EXAMPLE 1

930 parts of bisphenol-type epoxy resin ("Araldite #6071", a tradename for a product of Ciba-Geigy), 380 parts of bisphenol-type epoxy resin ("Araldite GY 2600", a tradename for a product of Ciba-Geigy), 550 parts of polycaprolactone diol ("Placcell #205", a tradename for a product of Daicell Chemical Industries, Ltd.), 2.6 parts of dimethylbenzylamine acetate, 79 parts of p-nonylphenol and 71 parts of a ketiminized product of monoethanolamine ketiminized with methyl isobutyl ketone were charged into a reactor, and reacted at 150° C. for 2 hours with stirring. The reaction mixture was mixed with 105 parts of diethanolamine, 180 parts of ethylene glycol monobutyl ether and 525 parts of ethylene glycol monoethyl ether, and reacted at 80° to 90° C. for 3 hours to give a resin solution (A) having a solids content of 75%.

SYNTHESIS EXAMPLE 2

Ethylene glycol monobutyl ether (26 parts) was added to a reactor, and heated to, and maintained at, 130° C. A mixture composed of 37.5 parts of polyester monomer having a solids concentration of 80% ("FMK-3X", a tradename for a product of Daicell Chemical Industries, Ltd.), 40 parts of styrene, 25 parts of 2-hydroxyethyl methacrylate, 5 parts of n-butyl methacrylate and 4 parts of $\alpha,\alpha'$-azobisisobutyronitrile was added dropwise over 5 hours, and the mixture was then maintained at 130° C. for 2 hours. Then, a mixture composed of 5 parts of ethylene glycol monobutyl ether and 0.5 part of azobisdimethylvaleronitrile was added dropwise to this mixture over 2 hours. Furthermore, the mixture was maintained at 130° C. for 2 hours, and 23 parts of ethylene glycol monoethyl ether was added, and the mixturewas cooled to give a resin solution (B) having a solids content of 62% and a number average molecular weight of about 5000.

PRODUCTION EXAMPLE 1

99.2 parts of the resin solution (A) obtained in Synthesis Example 1, 13.2 parts of the resin solution (B) obtained in Synthesis Example 2, 5.0 parts of 4,4'-diphenylmethane diisocyanate blocked with ethylene glycol mono-2-ethylhexyl ether, 12.4 parts of isophorone diisocyanate diblocked with methyl ethyl ketone ketoxime, 1 part of the illustrated tin compound [6] shown hereinabove and 0.5 part of polypropylene glycol having a molecular weight of about 4000 were mixed uniformly. To the mixture were added 1.0 part of lead acetate and 9.3 parts of 10% acetic acid, and they were further mixed uniformly. Then, deionized water was added, and the entire mixture was stirred uniformly to give an emulsion (I) having a nonvolatile content of 32%.

PRODUCTION EXAMPLE 2

A mixture composed of 5.72 parts of a solution of an epoxy resin having a quaternary ammonium salt of epoxy resin having a solids content of 60%, 14.5 parts of titanium white, 0.54 part of carbon black, 7.0 parts of clay, 2.3 parts of lead silicate and 25.49 parts of deionized water was dispersed in a ball mill until the resulting particles had a particle size of not more than 10 microns to give a pigment paste (A) having a nonvolatile content of 50%.

PRODUCTION EXAMPLE 3

Production Example 2 was repeated except that 3 parts of DOTO was further added, and the amount of deionized water was changed to 28.49 parts. A pigment paste (B) having a nonvolatile content of 50% was obtained.

EXAMPLE 1

An electrodeposition coating composition having a solids content of 20% was prepared by mixing 320.31 parts (100 parts by weight as the resin solids) of the emulsion (I) obtained in Production Example 1, 55.56 parts of the pigment paste (A) and deionized water.

Cationic electrodeposition was carried out in a bath containing the electrodeposition coating composition by using a zinc phosphate-treated steel plate as a cathode and a stainless steel plate as an anode and applying voltage so that the coated film as dried had a thickness of 25 micrometers. The excess of the coating composition was removed by washing the coated plate with water and the coated plate was baked at 170° C. for 20 minutes to prepare a coated plate for testing.

By changing the baking temperature in the above procedures to 150°, 160° and 170° C. respectively, coated plates for testing curability were prepared.

The coated plates were tested by the methods described hereinbelow. The test results are shown in Table 1.

EXAMPLES 2-10 AND COMPARATIVE EXAMPLES 1-3

In each run, Example 1 was repeated except that instead of the emulsion (I) obtained in Production Example 1, an emulsion prepared by using each of the organotin compounds in the indicated amount instead of 1 part of the tin compound [6] used in Production Example 1 was used. The results of the tests are shown in Table 1.

EXAMPLE 11

Example 1 was repeated except that 61.56 parts of the pigment paste (B) was used instead of 55.56 parts of the pigment paste (A). The results are shown in Table 1.

COMPARATIVE EXAMPLE 4

Example 1 was repeated except that an emulsion prepared as in Production Example 1 without using the tin compound [6] was used instead of the emulsion (I), and 61.56 parts of the pigment paste (B) was used instead of 55.56 parts of the pigment paste (A). The results are shown in Table 1.

COMPARATIVE EXAMPLE 5

Comparative Example 4 was repeated except that in the pigment paste (B) used in Comparative Example 4, 3 parts of DBTO was used instead of 3 parts of DOTO. The results are shown in Table 1.

EXAMPLE 12

Example 1 was repeated except that a self-crosslinking amine/bisphenol A-type epoxy resin adduct of tolylene diisocyanate monoblocked with ethylene glycol monoethyl ether and which is modified with a polyamide (a product of Kansai Paint Co., Ltd.; a resin for Elecron #9000) was used instead of the resins in the emulsion (I) used in Example 1. The test results are shown in Table 2.

COMPARATIVE EXAMPLE 6

Example 12 was repeated except that the tin compound [6] was not added to the emulsion used in Example 12, and 61.56 parts of the pigment paste (B) was used instead of 55.56 parts of the pigment paste (A). The results are shown in Table 2.

SYNTHESIS EXAMPLE 3

A flask fitted with a stirrer, a thermometer, a nitrogen introducing tube and a reflux condenser was charged with 518 parts of an epoxy resin having a number average molecular weight of 370 and an epoxy equivalent of 185 obtained by the reaction of bisphenol A with epichlorohydrin, 57 parts of bisphenol A and 0.2 part of dimethylbenzylamine, and the mixture was reacted at 120° C. until the epoxy equivalent reached 250. Then, 213 parts of epsilon-caprolactone and 0.03 part of tetrabutoxytitanium were added. The temperature was elevated to 170° C., and while maintaining this temperature, the reaction mixture was sampled periodically, and the amount of the unreacted epsilon-caprolactone was monitored by infrared absorption spectrum. When the conversion reached at least 98%, 148 parts of bisphenol A and 0.4 part of dimethylbenzylamine were further added, and the reaction was carried out at 130° C. until the epoxy equivalent reached 936. Then, 257.4 parts of methyl isobutyl ketone, 25.6 parts of diethylamine and 68.3 parts of diethanolamine were added and reacted at 80° C. for 2 hours. The reaction mixture was diluted with 143.4 parts of ethylene glycol monobutyl ether to give a solution of an amino group-containing modified epoxy resin having a resin solids content of 72% and an amine value (resin solids) of 54.5.

PRODUCTION EXAMPLE 4

Methyl ethyl ketoxime-blocked isophorone diisocyanate was added to the resin solution obtained in Synthesis Example 3 so that the amount of the blocked isocyanate groups became equivalent to the total amount of the primary hydroxyl groups and the primary amino groups in the epoxy/polyamine resin.

One part of the tin compund [6] and 1 part of polypropylene glycol having a molecular weight of about 4000 were uniformly mixed with 100 parts by weight as solids of the resin composition. Then, 9.6 parts of 10% acetic acid and 1 part of lead acetate were added. The mixture was heated to 60° C., and deionized water was gradually added with stirring to obtain an emulsion (II) having a resin solids content of 30% and good stability.

EXAMPLE 13

An electrodeposition coating composition having a solids content of 20% was prepared by mixing 335.33 parts (100 parts as resin solids) of the emulsion (II) obtained in Production Example 4, 55.56 parts of the pigment paste (A) and deionized water.

Cationic electrodeposition was carried out in a bath containing the electrodeposition coating composition by using a zinc phosphate-treated steel plate as a cathode and a stainless steel plate as an anode and applying voltage so that the coated film as dried had a thickness of 25 micrometers. The excess of the coating composition was removed by washing the coated plate with water and the coated plate was baked at 130° C. for 20 minutes to prepare a coated plate for testing.

By repeating the above procedure except that the baking temperature was changed to 120°, 130° and 140° C., coated plates for testing curability were prepared. The test results are shown in Table 3.

EXAMPLE 14

Example 13 was repeated except that 61.56 parts of the pigment paste (B) was added instead of 55.56 parts of the pigment paste (A). The results are shown in Table 3.

COMPARATIVE EXAMPLE 7

Example 14 was repeated except that the tin compound [6] was not added to the emulsion used. The results are shown in Table 3.

COMPARATIVE EXAMPLE 8

Example 14 was repeated except that 1 part of DBTDL was used instead of the tin compound [6] in the emulsion used. The results are shown in Table 3.

The tests in the above Examples and Comparative Examples were conducted by the following methods.

(1) Compatibility

One hundred parts of the resin in the coating composition, 10 parts of the organotin compound used in the coating composition and as required, a solvent were mixed uniformly. The mixture was then coated on a glass plate, and dried at 120° C. for 30 minutes. The appearance of the coating was then observed and evaluated on the following standards.

O: No turbidity nor haze occurred.
X: Whitely turbid and non-transparent.

(2) Bath stability

Three liters of the coating composition was put in a cylindrical stainless steel receptacle having a capacity of 4 liters, and stirred at 30° C. for 1 month. Then, electrodeposition coating was performed from the coating composition, and the appearance of the coated film was examined and evaluated on the following standards.

O: No film defects such as cratering and seeding were occurred.
X: Film defects such as cratering and seeding occurred.

TABLE 1

| | | Organotin compound | | Compati-bility | Bath stability | Curability | | | Corrosion resistance (mm) | Weather-ability |
|---|---|---|---|---|---|---|---|---|---|---|
| | | Type | Amount (PHR) | | | 150° C. | 160° C. | 170° C. | | |
| Example | 1 | Compound [6] | 1.0 | O | O | O | O | O | 2.0 | 240 |
| | 2 | Compound [7] | 1.0 | O | O | O | O | O | 2.0 | 240 |
| | 3 | Compound [3] | 1.0 | O | O | Δ | O | O | 2.0 | 240 |
| | 4 | Compound [2] | 1.0 | O | O | Δ | O | O | 2.0 | 240 |
| | 5 | Compound [12] (t-$C_4H_9$ at the p-position) | 1.0 | O | O | Δ | O | O | 2.0 | 240 |
| | 6 | Compound [16] (t-$C_4H_9$ at the p-position) | 1.0 | O | O | Δ | O | O | 2.0 | 240 |
| | 7 | Compound [20] (t-$C_4H_9$ at the p-position) | 1.0 | O | O | O | O | O | 2.0 | 240 |
| | 8 | Compound [24] (t-$C_4H_9$ at the p-position) | 1.0 | O | O | O | O | O | 2.0 | 240 |
| | 9 | Compound [6] | 0.2 | O | O | Δ | O | O | 2.0 | 240 |
| | 10 | Compound [6] | 5.0 | O | O | O | O | O | 2.0 | 240 |
| | 11 | Compound [6] DOTO | 1.0 3.0 | — | O | O | O | O | 2.0 | 200 |
| Comparative Example | 1 | DBTDL | 1.0 | X | X | X | Δ | O | 2.5 | 160 |
| | 2 | DBTDA | 1.0 | X | X | X | Δ | O | 3.0 | 180 |
| | 3 | DOTDL | 1.0 | X | X | X | Δ | O | 2.5 | 180 |
| | 4 | DOTO | 3.0 | — | O | Δ | O | O | 3.5 | 160 |
| | 5 | DBTO | 3.0 | — | O | Δ | O | O | 3.5 | 160 |

TABLE 2

| | Organotin compound | | Compati-bility | Bath stability | Curability | | | Corrosion resistance (mm) | Weather-ability |
|---|---|---|---|---|---|---|---|---|---|
| | Type | Amount (PHR) | | | 150° C. | 160° C. | 170° C. | | |
| Example 12 | Compound [6] | 1.0 | O | O | O | O | O | 2.5 | 100 |
| Comparative Example 6 | DOTO | 3.0 | — | O | Δ | O | O | 3.5 | 60 |

TABLE 3

| | Organotin compound | | Compati-bility | Bath stability | Curability | | | Corrosion resistance (mm) | Weather-ability |
|---|---|---|---|---|---|---|---|---|---|
| | Type | Amount (PHR) | | | 120° C. | 130° C. | 140° C. | | |
| Example 13 | Compound [6] | 1.0 | O | O | Δ | O | O | 2.0 | 280 |
| Example 14 | Compound [6] DOTO | 1.0 3.0 | — | O | O | O | O | 2.0 | 240 |
| Comparative Example 7 | DOTO | 3.0 | — | O | X | X | Δ | 5.0 | 200 |
| Comparative Example 8 | DBTDL DOTO | 1.0 3.0 | — | X | X | Δ | O | 3.5 | 220 |

(3) Curability

The coated plate for the curability test was rubbed through 30 reciprocations with a gauze impregnated with methyl isobutyl ketone, and then its surface and the gauze were examined and evaluated on the following standards.

O: No change
Δ: The color of the coated film adhered to the gauze, and many scratches occurred.
X: Part of the coated film was rubbed out and the substrate surface was exposed.

(4) Corrosion resistance

A crosscut was formed by a knife on the electrodeposited film so that the cut reached the substrate. The film was then subjected to a salt spray test for 1000 hours in accordance with JIS Z2371. Then, the widths of the rust and blister from the knife cut were measured.

(5) Weatherability

An aminoalkyd clear paint (Amilack Clear, a product of Kansai Paint Co., Ltd.) was coated further to a thickness of 35 micrometers on the baked electrodeposition coated plate, and baked at 140° C. for 15 minutes. The coated plate was subjected to a sunshine weatherometer for 20 hours, and then immersed in water at 40° C. for 20 hours. Crosscuts were formed on the coated plate, and a peel test was carried out using a cellophane adhesive tape. This test was repeated, and the total time of subjection to the weatherometer which elapsed until peeling of the aminoalkyd clear paint film occurred was measured.

In the corrosion reistance and weatherability tests, the coated plates baked at 170° C. were used for Examples 1 to 12 and Comparative Examples 1 to 6, and the coated plates baked at 130° C., for Examples 13 and 14 and Comparative Examples 7 and 8.

We claim:

1. An electrodeposition coating composition containing blocked isocyanate groups comprising at least one dialkyltin aromatic carboxylic acid salt represented by the following formula

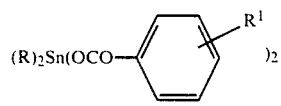

or

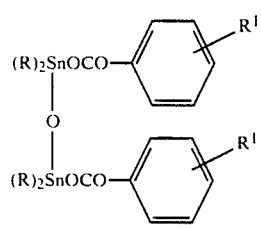

wherein R represents an alkyl group having 1 to 12 carbon atoms, and R¹ represents a hydrogen atom or an alkyl group having 1 to 4 carbon atoms.

2. The composition of claim 1 in which R¹ is a hydrogen atom or a t-butyl group.

3. The composition of claim 1 in which R is a butyl or octyl group.

4. The composition of claim 1 in which the dialkyltin aromatic carboxylic acid salt is selected from

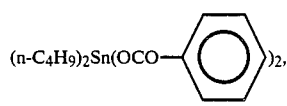

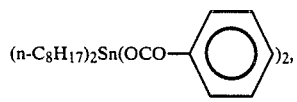

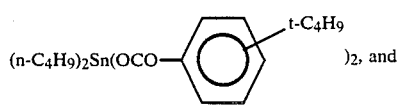

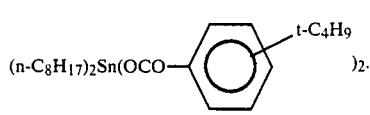

5. The composition of claim 1 in which the dialkyltin aromatic carboxylic acid salt is selected from

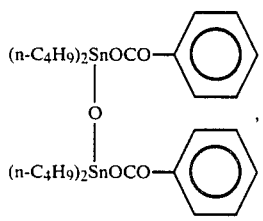

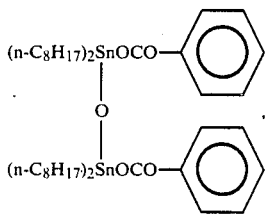

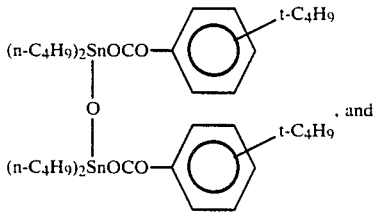

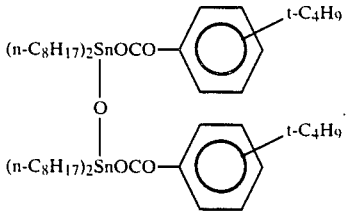

6. The composition of claim 1 in which the dialkyltin aromatic carboxylic acid salt is selected from

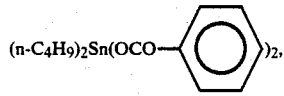

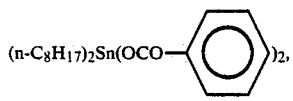

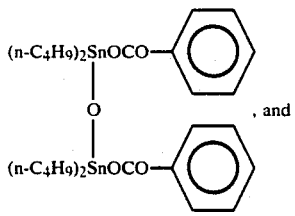, and

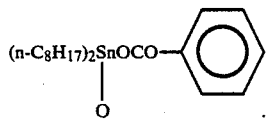

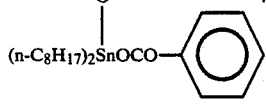

7. The composition of claim 1 in which the base resin is cationic.

8. The composition of claim 7 which comprises an amine-epoxy resin adduct as a base resin.

9. The composition of claim 8 in which the base resin does not contain blocked isocyanate groups in the molecule but is of an externally crosslinking type and which contains a blocked isocyanate compound as a crosslinking agent for the base resin.

10. The composition of claim 8 in which the base resin is of a self-crosslinking type containing blocked isocyanate groups.

11. The composition of claim 8 in which the base resin is a combination of a self-crosslinking type containing blocked isocyanate groups and an external crosslinking type free from blocked isocyanate groups and containing a blocked isocyanate compound as a crosslinking agent.

12. The composition of claim 1 in which the amount of the dialkyltin aromatic carboxylic acid salt is 0.05 to 10% by weight per 100 parts by weight of the resin solids in the composition.

13. A method of electrodeposition coating, which comprises coating the composition of claim 1 on the surface of a substrate by electrodeposition.

* * * * *